United States Patent [19]

Feaster

[11] 4,012,821
[45] Mar. 22, 1977

[54] ROLL SECTION AND MANUFACTURE OF SLEEVED ROLLER THEREWITH

[75] Inventor: Donavon L. Feaster, Mattapoisett, Mass.

[73] Assignee: Mount Hope Machinery Company, Incorporated, Taunton, Mass.

[22] Filed: July 11, 1975

[21] Appl. No.: 595,090

[52] U.S. Cl. .............................. 29/116 R; 29/125
[51] Int. Cl.² .................................. B21B 13/02
[58] Field of Search .......... 29/116 R, 116 AD, 125, 29/129.5, 130

[56] References Cited

UNITED STATES PATENTS

| | | | |
|---|---|---|---|
| 2,393,191 | 1/1946 | Robertson | 29/116 R X |
| 3,094,769 | 6/1963 | Robertson | 29/116 R |
| 3,094,771 | 6/1963 | Robertson | 29/116 AD |
| 3,213,513 | 10/1965 | Robertson | 29/116 R X |
| 3,665,572 | 5/1972 | Robertson | 29/116 AD X |
| 3,731,357 | 5/1973 | Shiral | 29/116 AD X |
| 3,783,481 | 1/1974 | Gallant | 29/116 AD X |
| 3,838,480 | 10/1974 | Depuy | 29/116 AD X |

FOREIGN PATENTS OR APPLICATIONS 1,098,418  1/1961  Germany .......................... 29/116 R

*Primary Examiner*—Alfred R. Guest
*Attorney, Agent, or Firm*—Kenway & Jenney

[57] ABSTRACT

A roll section, i.e., a spool and bearing assembly for supporting a roller sleeve, has a cylindrical spool laminated of rolled sheets. Axially-extending seams of the different laminates are arranged relative to one another to balance the assemblage. Retaining elements within the spool engage the bearing to lock it in place.

14 Claims, 4 Drawing Figures

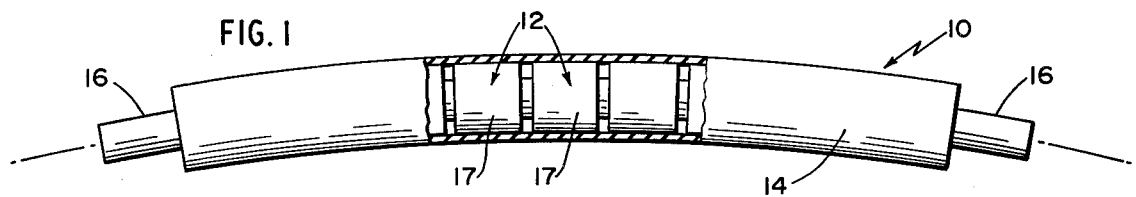
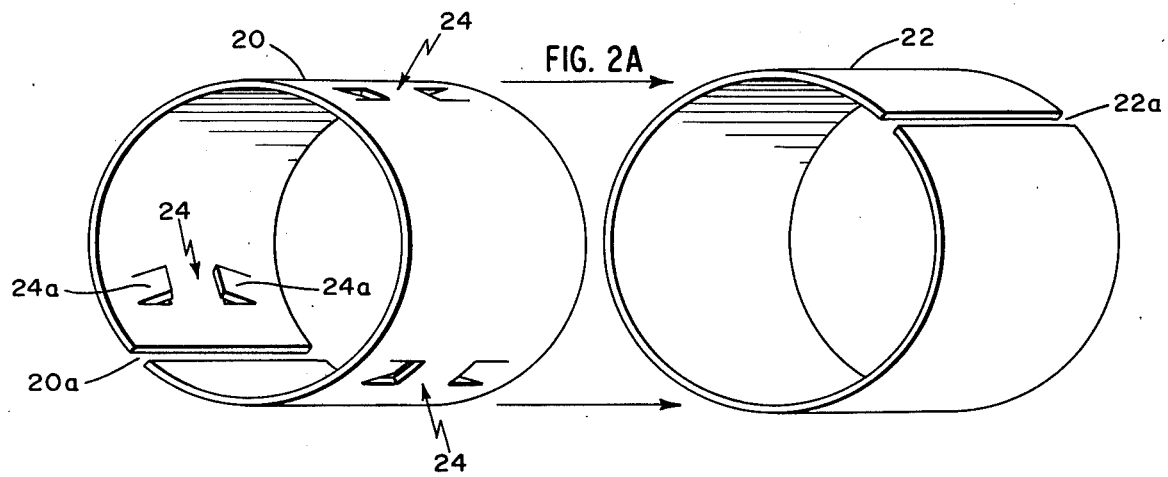
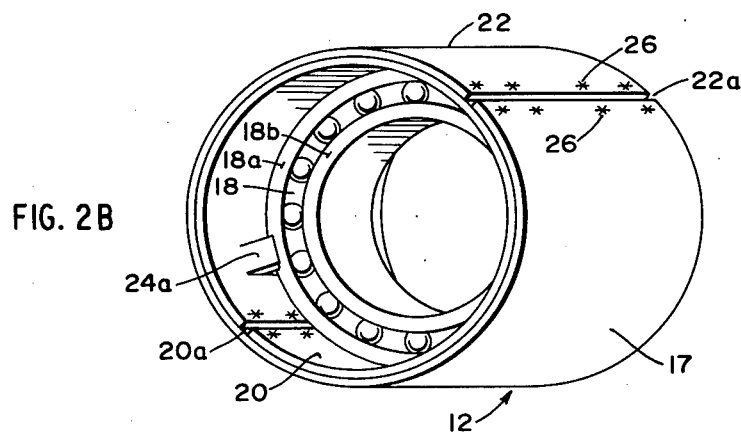
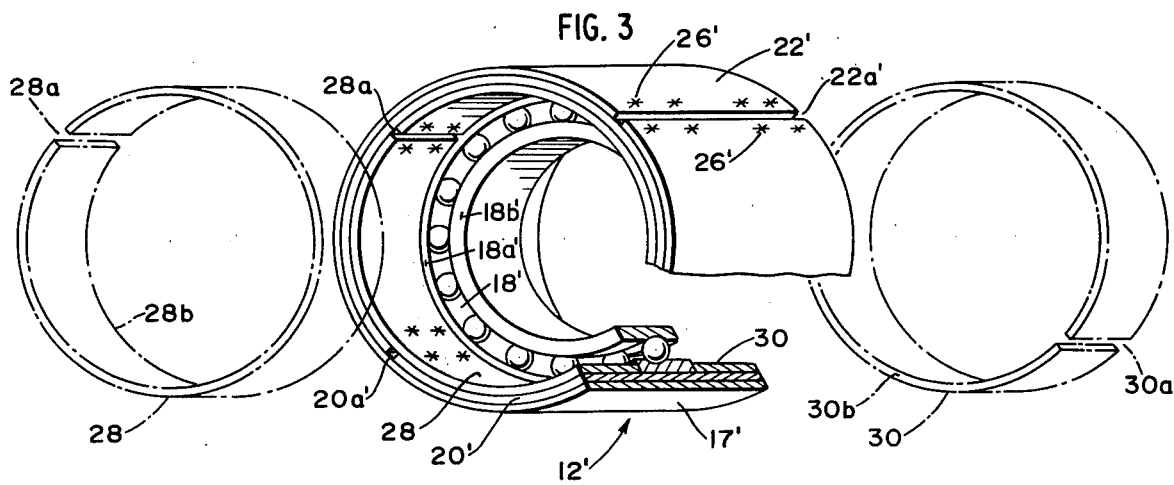

ROLL SECTION AND MANUFACTURE OF SLEEVED ROLLER THEREWITH

BACKGROUND OF THE INVENTION

This invention relates to a new construction for a roll section, which is a spool and bearing assembly used in a sleeved roller. In particular, the invention provides a roll section having a cylindrical spool laminated of rolled sheet stock and locked onto a bearing. The new roll sections offer significant economies in the manufacture and in the refurbishing of a roller. Hence the invention also provides improvements in the manufacture of a sleeved roller.

A sleeved roller, as shown for example in U.S. Pat. Nos. 2,393,191 and 3,783,481, has an outer sleeve rotatably mounted by way of roll sections on a stationary axle. More particularly, the sleeve is seated on the cylindrical spools of a set of axially-aligned roll sections. Each roll section has at least one anti-friction bearing seated within the spool and engaged on the axle. Each roll section thus serves to support a short axial length of the sleeve for rotation about the axle. Roll sections are particularly useful in providing this function in bowed rollers, as are shown in the above-noted patents. The roll section must have sufficiently accurate dimensions and sufficient rigidity to ensure that the outer sleeve engages the sheet or web being processed therewith with a circumferentially uniform pressure, even at high rotational speeds.

In the conventional manufacture of a sleeved roller, the roll sections are fabricated by machining spools out of tubular or other metal stock and press fitting one or more bearings within the bore of each spool. Close tolerances must be maintained in machining the spools to ensure that the inner and outer cylindrical surfaces are concentric and of the proper diameters. Otherwise, the resultant roller will engage the web or other sheet being worked with a pressure that varies as the roller turns, which is not acceptable. After the machined spools are press fitted onto bearings, the roll sections are assembled on an axle and the roller sleeve is applied.

This prior manufacture involves a relatively high cost for the stock from which the spools are machined and for the precise machining of the individual spools, as well as the costly storage of an inventory of the bulky roll sections until needed.

Further, machined spools add to the cost of refurbishing a roller. This is because costly care must be exercised in removing a bearing from its press fit within a spool in order to avoid damage.

It is also known, as appears for example in U.S. Pat. Nos. 2,854,131 and 3,838,480, to form roller spools by drawing sheet stock through a die. However, it is difficult to control both the inner diameter and the outer diameter of a spool with this cold-forming procedure. Further, the complete formation of a spool in this manner generally involves several cold-forming operations, so that intermediate annealing is usually required. The result is that this procedure results, for most applications, in a spool that has insufficient dimensional integrity, lacks sufficient strength, and is relatively high in cost.

Accordingly, it is an object of this invention to provide a low cost construction for a sleeved roller. In particular, it is an object of the invention to provide a roll section that has a relatively low factory cost. A further object is to provide a relatively low cost roller spool that has precisely dimensioned and highly concentric inner and outer diameters, and which is rotationally balanced.

Another object of the invention is to provide a sleeved roller with roll sections that are less costly to refurbish than is presently the case with machined spools.

It is also an object of the invention to provide a roll section structure that can readily be fabricated with different outer diameters. It is a further object to provide a roll section having secure mounting of the bearing within the spool, and to provide a roll section that can be fabricated readily with the required tolerances.

Other objects of the invention will in part be obvious and will in part be set forth hereinafter.

SUMMARY OF THE INVENTION

The invention overcomes the foregoing and other problems attendant with conventional roll sections by providing a spool fabricated with two or more concentric cylindrical laminae, each rolled from standard sheet stock. Further, the roll section has retaining elements that positively engage the bearing to lock it within the spool. Preferred retaining structure includes sleeves secured within the inner laminate and abutting both ends of the bearing outer race. In another construction, the inner laminate is deformed radially inward to form abutments that trap the bearing. Spot welds of the outer laminate to the layer beneath it, and of the inner laminate to the bearing-retaining sleeves when used, preferably are used to secure the assembled spool and bearing together. Typically, two rolled cylinders suffice to provide a spool of the requisite rigidity.

The new roll section is readily manufactured with close diameter tolerances and with high concentricity. This is because it utilizes the precise and accurate tolerances available with the commercial grade of components from which it is constructed, i.e., bearings with precise diameters and sheet stock with precise and highly uniform thicknesses. Moreover, due to the uniformity of commercial sheet stock, the spool is readily balanced about the rotation axis by balancing the seams of the several laminae. There typically is a narrow gap at each seam and the cylindrical layers are dimensioned so that these gaps have essentially equal volumes. Further, the cylindrical layers are rotationally oriented one to the other to locate the gaps symmetrically about the rotation axis, i.e., in a two-layer spool, the gaps are diametrically opposite one another.

The roll sections of the invention provide several cost savings, particularly as compared with the previously conventional practice employing machined spools. Sheet stock as used for fabricating the rolled spools is less costly than solid tubular stock or the like from which the prior spools are machined; and the cost of fabricating the rolled spools is significantly less than that of the machined variety. Moreover, one needs only to store an inventory of highly compact sheet stock, rather than to store a variety of bulky machined rolls. Further, by combining laminae of different sheet stock thicknesses, one readily can tailor the diameters of a spool to desired specified values.

A sleeved roller employing the roll sections of the invention enjoys a further cost saving upon being refurbished, for it is cost-wise economical simply to slit the rolled spool and recycle the material. This ensures recovery of the bearings without damage to them, and in a manner that requires minimal skilled labor.

The invention accordingly comprises the several steps and the relation of one or more of such steps with respect to each of the others, and the article possessing the features, properties and relation of elements exemplified in the following disclosure, and the scope of the invention is indicated in the claims.

BRIEF DESCRIPTION OF DRAWINGS

For a fuller understanding of the nature and objects of the invention, reference should be made to the following detailed description and the accompanying drawings, in which:

FIG. 1 shows a bowed sleeved roller, partly broken away, employing roll sections of the invention;

FIG. 2A is an exploded perspective view of the sleeves;

FIG. 2B is a perspective showing of a roll section after assembly; and

FIG. 3 is a similar showing of an alternative construction for a roll section according to the invention.

DESCRIPTION OF ILLUSTRATED EMBODIMENTS

With reference to FIG. 1, a roller 10 employs roll sections 12 embodying the invention to mount an outer sleeve 14 for rotation about a non-rotating axle 16. Straight and bowed rollers of this type are known in the art as disclosed for example in the above-noted U.S. patents and are available from the assignee hereof. Each roll section 12 includes a cylindrical spool 17 seated on an anti-friction bearing. The roller sleeve is seated on the spools and the bearings are fixedly seated on the axle.

As noted above, it is important that the several roll sections have cylindrical outer surfaces, and that these surfaces be of uniform diameter and be concentric with the bearing races and hence with the center line of the axle 16. These parameters are required to attain uniform pressure of the sleeve 14 against whatever sheet material is being worked on the roller 10.

As detailed in FIG. 2, a roll section 12 embodying the invention is constructed with a spool 17 formed of two concentric cylinders, an inner cylinder 20 and an outer cylinder 22. The spool inner surface carries retaining elements indicated generally at 24 that lock the bearing 18 in place.

Each cylinder 20, 22 is formed from flat sheet stock of the desired thickness which is cut to size then rolled to the cylindrical form shown, with an axial seam 20a, 22a. This is a non-overlapping seam and, as shown, has a gap extending axially along the length of the sleeve. Prior to being rolled, the illustrated inner sleeve 20 is selectively pierced to provide retaining elements 24 in the form of inwardly extending radial protrusions which, upon fabrication with the bearing, lock the bearing outer race to the inner sleeve and hence to the spool 17. The illustrated retaining elements thus formed are three circumferentially spaced pairs of axially spaced tabs 24a pierced from the sheet material of the inner cylinder to engage opposite axial sides of the bearing outer race 18a.

After the two cylinders 20, 22 are formed in the foregoing manner and as shown in the top of FIG. 2, they are assembled with the bearing as shown in the lower portion of the drawing. That is, the bearing 18 is fitted between paired tabs 24a inside the inner cylinder 20 and this assemblage is fitted within the outer cylinder 22. The outer cylinder 22 thus covers the depressions formed in the inner sleeve, i.e., cover the deformations that form the retaining elements, to provide a spool outer surface that is completely smooth except at the seam 22a.

The outer sleeve is then clampingly engaged onto the inner sleeve, which in turn similarly compressively engages the inner sleeve onto the bearing. With the elements in this compressive engagement, the two sleeves are secured together, preferably by welding. FIG. 2 shows a preferred arrangement having spot welds 26 at several axially-spaced points along each side of the outer seam 22a. With this construction, the spool-forming cylinders and the bearing outer race rotate as a single unit without vibration or other looseness, even at the high rotational speeds and under the working stresses which sleeved rollers typically encounter. As FIG. 2 also shows, the illustrated spool has spot welds 26 joining the two cylinders along both edges of the seam 20a. Additional welds, preferably in axially-extending rows which are symmetrically spaced, can be provided for added rigidity, e.g., two diametrically opposite rows of spot welds can be provided, each half-way between the seams 20a and 22a.

As FIG. 2 also shows, the roll section is balanced about its central rotation axis by balancing the seams of the laminated, rolled cylinders. More particularly, the cylinders are dimensioned to have gaps of essentially equal volume, and are rotationally oriented with the gaps symmetrically disposed relative to each other. Where the cylinders are of equal thickness sheet material, the gaps are of correspondingly equal thickness sheet material, the gaps are of correspondingly equal width although a small difference can be prescribed to offset the larger mean diameter of the outer sleeve relative to that of the inner sleeve. Where the cylinders are fabricated of sheet materials of different thicknesses, the seam gaps have correspondingly different widths. Also, when the sleeves are of different thickness materials, it is preferable that the outer sleeve 22 be of the thicker material so that the resulting narrower gap is on the outer surface of the spool, i.e., is the gap 22a.

It will be appreciated that it is desired that the spool have a smooth, continuous cylindrical outer surface to ensure that it presses the roller sleeve against the sheet being worked with uniform pressure. However, the small gap 22a in the spool outer surface has been found not to detract from this uniform-pressure operation of the resultant roller. The maximum allowable width of this outer gap depends on the configuration and composition of the roller sleeve 14 (FIG. 1).

With further regard to FIG. 2, in the event the rolled spool 17 is slightly out-of-round adjacent the outer seam 22a, as can result from incomplete rolling of the cylinder 22 at the seam-forming edges, a light grinding or similar finishing along the cylinder edges that form the gap 22a can provide a curvature of constant radius over the entire cylindrical outer surface of the spool. Where the components of the roll section are secured together by welding adjacent the seam 22a as illustrated, this same finishing operation can smooth out any welding deformations.

The roll section 12 of FIG. 2 can be constructed with more than two laminae, although a two-cylinder structure as illustrated generally is the least costly and provides adequate rigidity and strength. There are, however, certain advantages to providing two thicknesses of material everywhere on the spool 17 including at the gap seams, as is discussed below with reference to FIG. 3.

Alternative to FIG. 2, FIG. 3 shows a construction for a roll section according to the invention in which the spool-forming cylinders are free of bearing-locking structure, and in lieu thereof sleeves are provided to retain the bearing. More particularly, the spool 12' of FIG. 3 has an inner cylinder 20' and an outer cylinder 22' similar to those described with reference to FIG. 2, except that the inner cylinder is free of retaining elements. Instead, two sleeves 28, 30 are secured, typically by welding, within the inner cylinder 20' in abutment against opposite sides of the bearing outer race. It is considered preferable that the sleeves extend from the bearing throughout the remaining length of the spool, as illustrated. The seams 28a and 30a of the two sleeves, which typically are identical, are again disposed opposite each other and intermediate the cylinder seams 20a and 22a, to provide geometric symmetry and thereby ensure rotational balance.

The roll section 12' of FIG. 3 is considered to have several operational advantages over the construction of FIG. 2. The bearing-retaining sleeves 28, 30 provide a minimum of two layers of sheet material throughout the spool 17', even at the cylinder gaps. This minimizes stress concentrations within the spool and minimizes deformation under operational loading. A further advantage of the FIG. 3 construction is that it facilitates attaining optimal alignment of the bearing axis exactly parallel to the spool axis. This is readily done with the FIG. 3 structure by providing each sleeve 28, 30 with a bearing-abutting annular end face 28a, 30a that is planar and exactly perpendicular to the cylindrical rotation axis of the sleeve. That is, the sleeves 28 and 30 provide this optimal alignment of the bearing when provided with truly "square" ends; which can be readily attained.

As indicated above, both roll section constructions shown in FIGS. 2 and 3 are sufficiently low in cost so that when the bearing is to be removed, the spool is simply slit axially, which releases the bearing. This operation can be done quickly with relatively unskilled and hence low-cost labor and with minimal likelihood of damaging the bearing.

Although the invention has been described with reference to roll sections each of which has a single bearing, features of the invention are equally applicable to roll sections having more than one bearing, as well as other known variations.

Further, aspects of the invention disclosed herein can apply to the manufacture of cylindrical roller spools per se, i.e., without a bearing. That is, aspects of the invention can be practiced in fabricating such a spool of axially-rolled sheet stock, i.e., sheet stock rolled into a cylinder with an axial seam as distinguished for example from a spirally wound configuration. As described above, it has been found that this construction has the requisite strength and dimensional precision and integrity for a roller spool.

Such a spool is fabricated without a bearing in accordance with the invention two or more axially rolled cylinders in the manner described above with reference to FIGS. 2 and 3. Typically, all cylinders are uniformly smooth, i.e. as in FIG. 3 and without structure such as the pierced retaining tabs 24a of FIG. 2. Alternatively, a circumferentially extending shoulder can be provided within the spool to position a subsequently installed bearing. The shoulder elements can be provided by forming an inward protrusion on the inner sleeve, e.g., a series of circumferentially spaced single tabs like the paired tabs 24a of FIG. 2. Another form of shoulder element is to include one sleeve 28 or 30 of FIG. 3 in the spool upon fabrication.

The cylinders, and separate shoulder element if any, are asssembled with each other in the manner described above with the gaps rotationally balanced and are secured together, preferably by welding. However, the assembly is on a removable mandrel instead of on a bearing. The mandrel has a cylindrical outer surface dimensioned in the prescribed manner in which the bearing will be secured in place; e.g., where a press fit is to be used, the mandrel has a slightly smaller outer diameter than the bearing. Roller spools formed in this manner, i.e., of axially rolled sheet stock with rotationally-balanced gap seams, have many of the advantages described above for the roll sections of FIGS. 2 and 3.

It will thus be seen that the objects set forth above, among those made apparent from the preceding description, are efficiently attained. Since certain changes may be made in carrying out the above fabrication and refurbishing operations, and in the roll sections and rolled spools, without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A roll section having a cylindrical spool and anti-friction rotational bearing means seated within the bore thereof, said roll section having the improvement comprising
    A. at least first and second concentric and contiguous conjoined cylindrical members, the outer surface of said second member forming the spool outer surface,
    B. bearing-locking means securing the bearing means within the inner surface of said first member, and
    C. a non-overlapping seam axially extending along the length of each cylindrical member, said seams of said first and second members being rotationally balanced relative to one another.

2. A roll section according to claim 1 having the improvement further comprising a first rolled sheet of uniform thickness forming said first cylindrical member and a second rolled sheet of uniform thickness forming said second cylindrical member.

3. A spool and bearing assembly comprising
    A. first and second concentric, conjoined cylindrical members
        1. each of uniform thickness,
        2. each having a non-overlapping seam extending axially along the length thereof, and
        3. said members contiguously disposed with said second member outermost and rotationally balanced about the axis of concentricity, and
    B. at least one anti-friction rotational bearing having an inner race and an outer race, said bearing being fixedly disposed concentrically within the conjoined cylindrical members with said outer race contiguous with said first member.

4. A spool and bearing assembly as defined in claim 3 further characterized in that said members are rotationally oriented with said seams symmetrically located relative to one another about the axis of concentricity.

5. A spool and bearing assembly as defined in claim 4 in which the means conjoining said first and second cylindrical members comprises welds between said members and located along both sides of said seam of said second member.

6. A spool and bearing assembly as defined in claim 3 further characterized in that A. each said non-overlapping seam is a gap axially extending along the length thereof, and said gap of said first member has substantially the same volume as the gap of said second member, and B. in which said members are rotationally oriented with said gaps diametrically opposite one another.

7. A spool and bearing assembly as defined in claim 3 further comprising bearing-securing projections extending radially inward from said first cylindrical member in abutting engagement with axially opposite sides of the bearing outer race and securing the bearing within said conjoined members.

8. A spool and bearing assembly as defined in claim 3 further comprising first and second sleeves, each of substantially uniform thickness, secured within said first cylindrical member contiguous thereto and in abutting engagement with axially opposite sides of the bearing outer race for securing the bearing within the conjoined members.

9. A spool and bearing assembly as defined in claim 3 further comprising welds securing said first and second cylindrical members together.

10. A laminated cylindrical roller spool comprising

A. at least first and second concentric cylindrical members
  1. each cylindrical member being formed by rolling and being of uniform thickness and having a non-overlapping seam extending axially along the length thereof,
  2. said cylindrical members being contiguously disposed one with another with said second member outermost and being rotationally oriented with said seams being symmetrically located relative to one another about the axis of concentricity, and B. means joining said cylindrical members together.

11. A laminated cylindrical roller spool according to claim 10 in which the means joining said cylindrical members comprises spot welds between said members and located along both sides of said seam of said second member.

12. A laminated cylindrical roller spool as defined in claim 10 further characterized in that A. each said cylindrical member has, at said seam thereof, a gap axially extending along the length thereof, of substantially the same volume as the seam gap of each other cylindrical member, and B. said members are rotationally oriented with said gaps symmetrically disposed.

13. A laminated cylindrical roller spool as defined in claim 10 further comprising means forming a circumferential shoulder within the spool bore for seating a bearing element with the rotational axis of the bearing aligned parallel to the axis of concentricity of said cylindrical members.

14. A laminated cylindrical roller spool comprising

A. at least first and second concentric cylindrical members
  1. each cylindrical member being formed by rolling and being of uniform thickness and having a non-overlapping seam extending axially along the length thereof,
  2. said cylindrical members being contiguously disposed one with another with said second member outermost and being rotationally oriented with said seams being symmetrically located relative to one another about the axis of concentricity,
  3. each said cylindrical member having, at said seam thereof, a gap axially extending along the length thereof of substantially the same volume as the seam gap of each other cylindrical member, B. means joining said cylindrical members together, and C. means forming a circumferential shoulder within the spool bore for seating a bearing element with the rotational axis of the bearing aligned parallel to the axis of concentricity of said cylindrical members.

* * * * *

UNITED STATES PATENT AND TRADEMARK OFFICE
CERTIFICATE OF CORRECTION

PATENT NO. : 4,012,821
DATED : March 22, 1977
INVENTOR(S) : Donavon L. Feaster

It is certified that error appears in the above-identified patent and that said Letters Patent are hereby corrected as shown below:

On the first page of the patent, the Assignee should be --Mount Hope Machinery Company--. "Incorporated" should be deleted.

Column 5, line 61, after "invention" insert --with--.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks